United States Patent [19]

Webb

[11] Patent Number: 4,909,378

[45] Date of Patent: Mar. 20, 1990

[54] MECHANICAL HANDLING APPARATUS

[75] Inventor: John E. R. Webb, Anglesey, Wales

[73] Assignee: Hydraroll Limited, Gwynedd, United Kingdom

[21] Appl. No.: 222,345

[22] Filed: Jul. 20, 1988

Related U.S. Application Data

[63] Continuation of Ser. No. 851,824, Apr. 14, 1986, abandoned.

[30] Foreign Application Priority Data

Nov. 18, 1985 [GB] United Kingdom ............ 8528362

[51] Int. Cl.⁴ ........................................... B65G 17/02
[52] U.S. Cl. ............................... 198/721; 198/725; 198/735; 198/809; 414/528; 414/529
[58] Field of Search ............... 198/717, 718, 721, 725, 198/774, 776, 955, 735, 809; 414/528, 529

[56] References Cited

U.S. PATENT DOCUMENTS

| | | | |
|---|---|---|---|
| 2,932,380 | 4/1960 | Alvey, Jr. et al. ................ | 198/809 |
| 3,545,596 | 12/1970 | Turnbough ...................... | 198/721 X |
| 3,620,353 | 11/1971 | Foster ............................. | 198/809 |
| 3,871,534 | 3/1975 | Bursk ............................. | 198/776 X |
| 3,930,573 | 1/1976 | Wyman .......................... | 198/809 |
| 3,934,707 | 1/1976 | Bowman ........................ | 198/809 X |
| 4,071,137 | 1/1978 | Fink ............................... | 198/774 |
| 4,149,626 | 4/1979 | Holt ............................... | 198/718 |
| 4,357,128 | 11/1982 | Gooden et al. ................. | 198/774 X |
| 4,593,810 | 6/1986 | Cook ............................. | 198/781 |
| 4,732,265 | 3/1988 | von Stein ...................... | 198/721 |

FOREIGN PATENT DOCUMENTS

| | | | |
|---|---|---|---|
| 0002106 | 5/1979 | European Pat. Off. ......... | 198/809 |
| 0956377 | 9/1982 | U.S.S.R. ......................... | 198/774 |
| 2133377 | 7/1984 | United Kingdom ............ | 198/774 |
| 2163117 | 2/1986 | United Kingdom ............ | 198/790 |

Primary Examiner—Robert J. Spar
Assistant Examiner—Lyle Kimms
Attorney, Agent, or Firm—Shapiro and Shapiro

[57] ABSTRACT

Mechanical handling apparatus for moving a load over a support surface comprises an endless powered conveyor device which extends substantially over at least part of the length of the support and is trained round guides or pulleys rotatable about substantially horizontal axes. The endless conveyor device comprises a chain having a working run and a return run the working run of which comprises at least two working parts, which are movable vertically independently or in unison. In a preferred embodiment, each conveyor device comprises two side-by-side chains. The endless chains run in a guide for the working run and a guide for the return run. The guides are mounted one on top of the other, the lower guide being of inverted channel section and the upper guide being of upwardly open channel section which rises and falls within an outer channel on a support plate which is in contact with an inflatable device such as an air bag in order to provide a smooth and uniform raising and lowering. Guides in the form of angles are secured to outer flanges of the outer channel limbs of the angles guiding the inner channel as it rises and falls when the air bag is inflated and deflated. Between the base or web of the inner channel and the two chains a plastic slide block provides for slippage of the chains in the desired direction. The return run of the chains is supported on a runner plate secured to the vehicle floor within the lower channel, which is itself secured to the vehicle floor. The outer channel and the lower channel are secured together by welding, and the guide angles are secured to the limbs as by screws, to provide a rigid structure which is compact and houses the working and return runs of the chains.

18 Claims, 3 Drawing Sheets

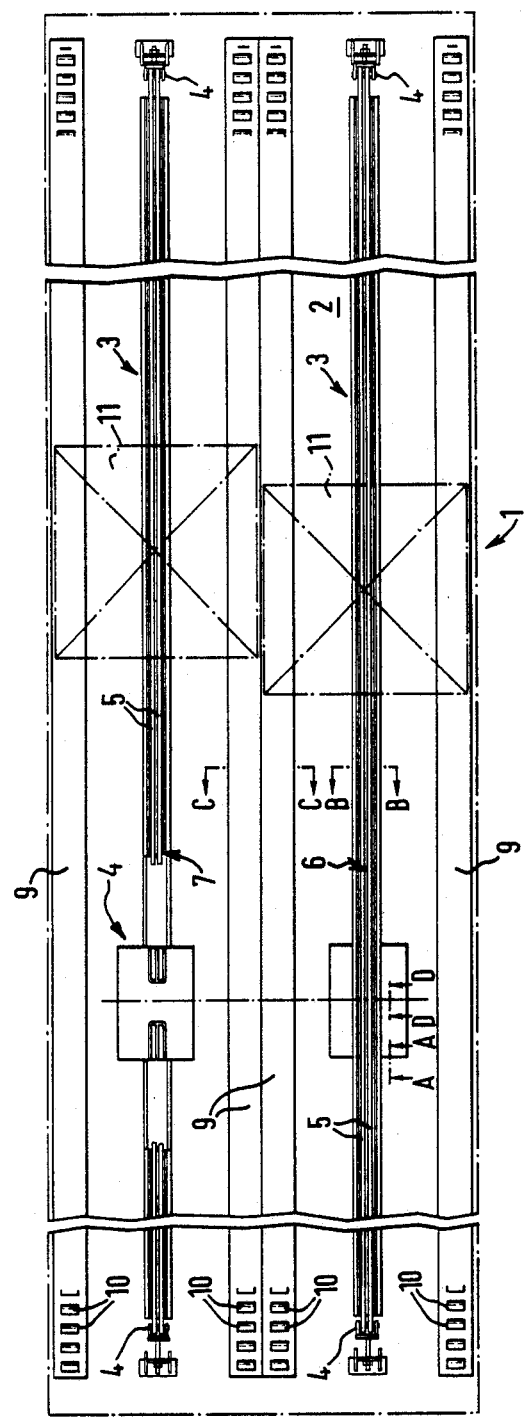
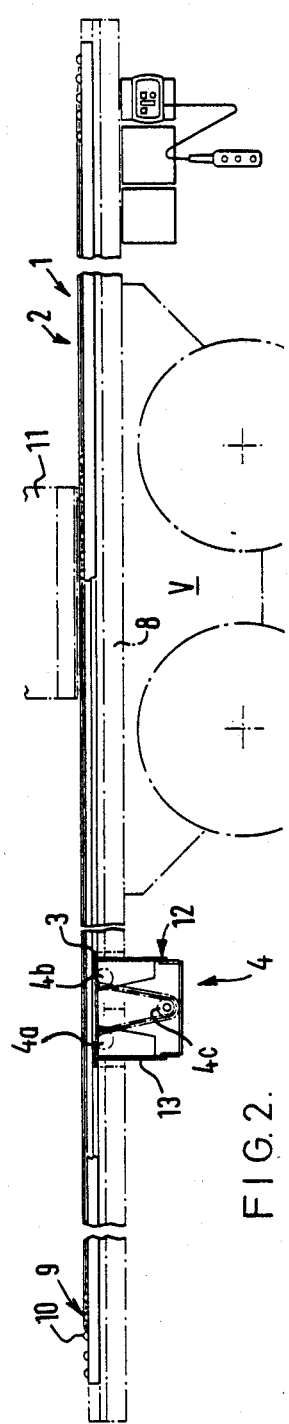
FIG.1.
FIG.2.

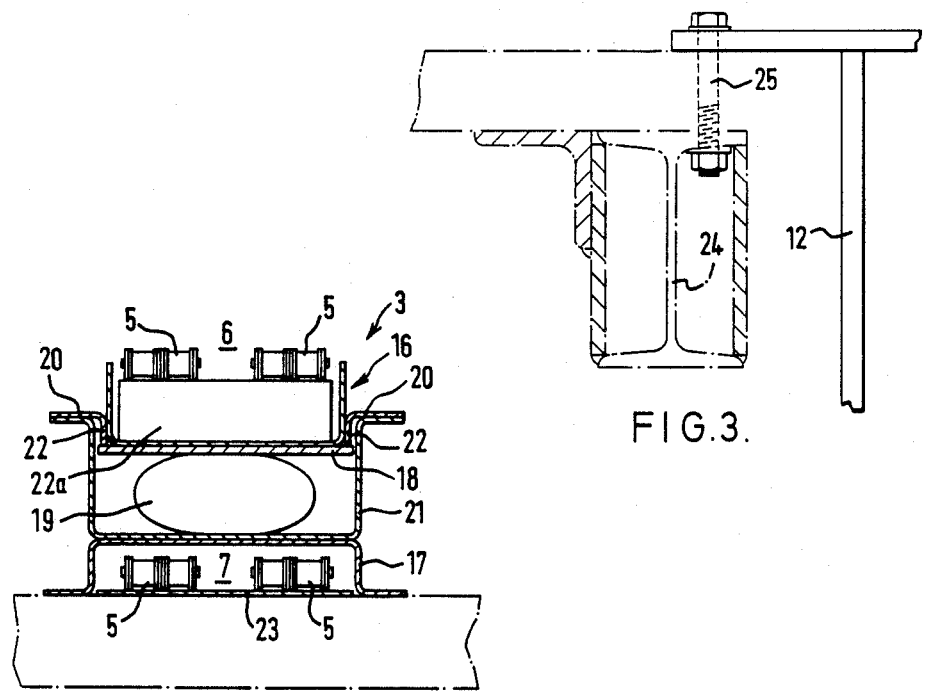
FIG.3.
FIG.4.
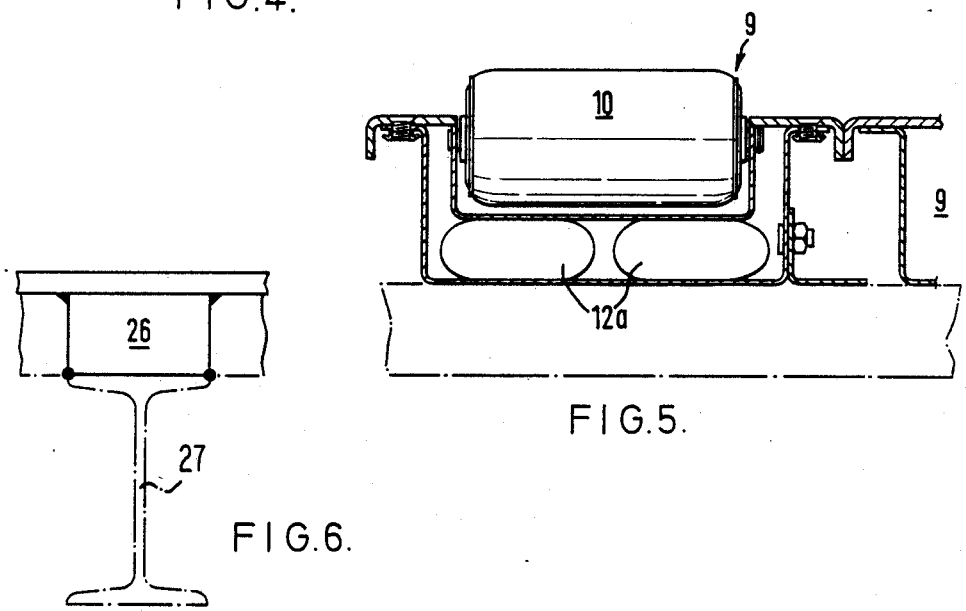
FIG.5.
FIG.6.

MECHANICAL HANDLING APPARATUS

This is a continuation application of Ser. No. 851,824 filed Apr. 14, 1986, now abandoned.

The invention relates to mechanical handling apparatus.

According to the invention there is provided mechanical handling apparatus for moving a load over a support surface, comprising an endless powered conveyor device which extends substantially over at least part of the length of the support surface and is trained round guide means or pulley means rotatable about substantially horizontal axes.

There may be at least two parts at least one of which is movable between a load-engaging position and a non-load-engaging position.

The whole of the length of the conveyor device may be movable between a load-engaging position and a non-load-engaging position.

There may be two parts which are separated by a well through which the endless conveyor means passes.

The well may be defined by a housing suspended from the support surface.

There may be drive motor means in the housing.

The housing may include a removable access panel.

The endless conveyor device may comprise a guide for a working run thereof, and a guide for a return run thereof, both guides being mounted on the support surface.

The means for moving the device between the load-engaging position and the non-load-engaging position may comprise inflatable means.

The inflatable means may comprise pneumatic means.

The pneumatic means may be housed between the two said guides.

The two said guides respectively may comprise a channel section member, one of which is mounted substantially vertically on the other with the pneumatic means therebetween.

The guide for the working run may comprise a plastic support block within the channel.

The endless device may comprise a chain.

The mechanical handling apparatus may be mounted substantially parallel with a roller conveyor.

The roller conveyor may be movable between a first position in which a load is in use engaged and a second position in which the roller conveyor is disengaged from a load.

The roller conveyor may be movable by an inflatable pneumatic means.

The pneumatic means may comprise an air bag.

There may be two roller conveyors with said apparatus therebetween.

Mechanical handling apparatus embodying the invention is hereinafter described, by way of example, with reference to the accompanying drawings, in which:

FIG. 1 is a plan view of one embodiment of mechanical handling apparatus according to the invention;

FIG. 2 is a side elevational view of the apparatus of FIG. 1;

FIGS. 3-6 show enlarged sectional views respectively on lines A—A, B—B, C—C and D—D of FIG. 1;

Figure 7:
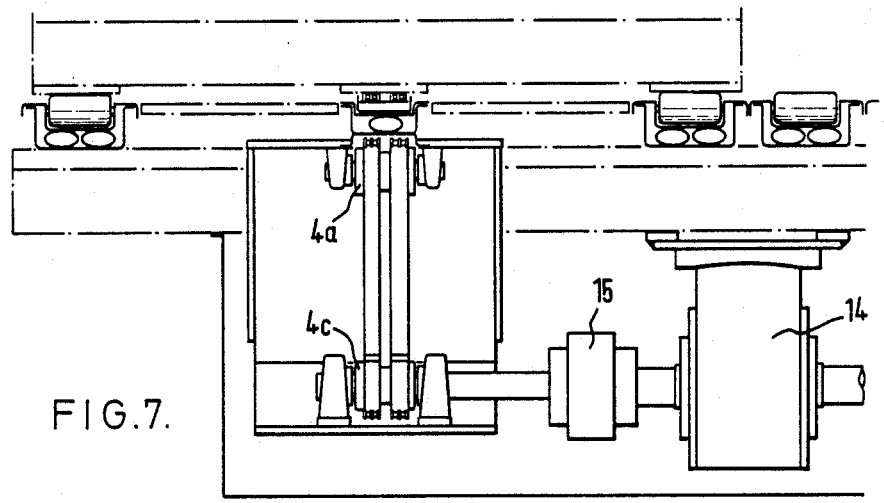
FIG. 7 shows an enlarged sectional arrangement of a drive unit, drive coupling and drive motor.
Figure 8:
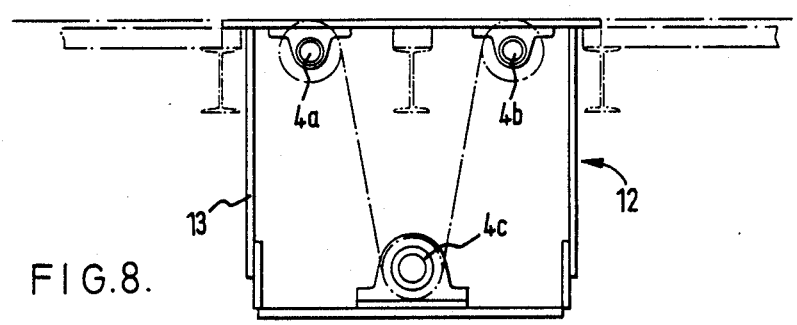
FIG. 8 shows an end view of the drive unit of FIG. 7.
Figure 9:
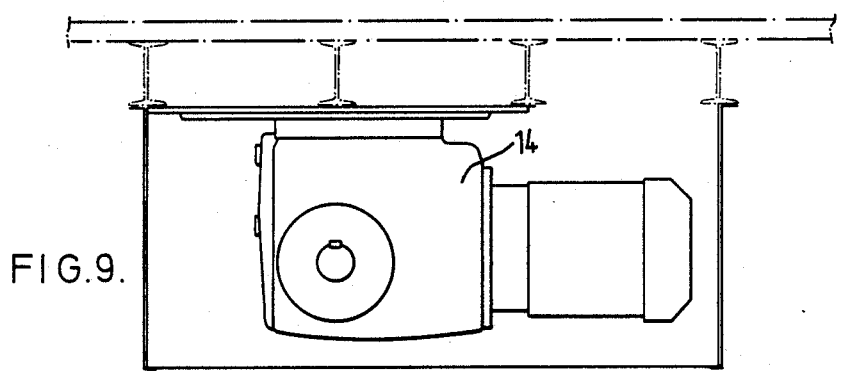
FIG. 9 shows a sectional view of a mounting of the motor.

Referring to the drawings there is shown mechanical handling apparatus 1 for moving a load over a support surface 2, comprising an endless powered conveyor device 3 which extends substantially over at least part of the length of the support surface and is trained round guide means or pulley means 4 rotatable about substantially horizontal axes.

The endless conveyor device 3 comprises a chain 5 having a working run 6 and a return run 7, the working run 6 of which comprises at least two working parts which are movable vertically independently or in unison. In the embodiment shown, each conveyor device in fact comprises two side-by-side chains 5.

The support surface 2 comprises a surface laid over a floor 8 of a container vehicle V in the embodiment shown. The surface 2 also has mechanical handling apparatus in the form of rise and sink conveyors 9 which are in the form of tracks which extend substantially the length of the surface 2 and comprise a plurality of rollers 10 which are raisable and lowerable with respect to the surface between a position in which the rollers 10 protrude above the surface for passage of a load such as a pallet 11 thereover and a position in which the rollers 10 are retracted below the level of the surface for support of the pallets on the surface for storage or transport. There are two sets of conveyors 9, one set being for handling pallets in one row and the other set for handling pallets in an adjacent row. Each roller conveyor set is caused to rise and sink by two inflatable devices 12a such as air bags which extend the length of each roller track 9 and are inflatable by means forming part of the pneumatic system of the vehicle or a tractor unit which tows it.

Between the tracks 9 of each set of pneumatic roller conveyors there is an endless conveyor device 5,6,7.

The working run 6 is raisable to engage the underside of the pallets 11 to move same along the support surface 2 so that crowding is obtained, and therefore the maximum utilization of the interior space of the vehicle is obtained. The top (as viewed in FIG. 1) conveyor device 3 is shown at the return run, the lower (as viewed) conveyor device is shown in the working run.

The return run 7 of the conveyor device passes round idler sprockets 4a and 4b and a driven sprocket 4c, all of which are housed in a housing 12 which is suspended from underneath the support surface 2 and which has a removable end panel 13 for access to the interior thereof for maintenance etc. The driven sprocket 4c is driven by an in-line electric motor 14, secured to the underside of the main floor of the vehicle, through a drive coupling unit 15. The axes of the sprockets and the output shaft of the motor extend transversely to the length of the conveyor device and the pneumatic roller tracks 9.

The endless chains 5 run in a guide 16 for the working run and a guide 17 for the return run. The guides 16 and 17 are mounted one on top the other, the lower guide being of inverted channel section and the upper guide 16 (as viewed in FIG. 4) being of upwardly open channel section which rises and falls within an outer channel 21 on a support plate 18 which is in contact with inflatable means such as an air bag 19 in order to provide a smooth and uniform raising and lowering. Guides in the form of angles 20 are secured to outer flanges of the outer channel 21, limbs 22 of the angles guiding the inner channel 16 as it rises and falls when the air bag 19 is inflated and deflated. As shown in FIG. 4, the lower ends of limbs 22 constitute stops for the marginal portions of support plate 18 which project laterally to either side of inner channel 16 and thus come into abutment with the lower ends of the limbs when the inner channel is raised. Between the base or web of the inner channel 16 and the two chains 5 is a plastic support block 22a which provides for slippage of the chains 5 in the desired direction. The return run of the chains is supported on a runner plate 23 secured to the vehicle floor within the lower channel 17, which is itself secured to the vehicle floor. The outer channel 21 and the lower channel 17 are secured together by welding, and the guide angles 20 are secured to the limbs 22 as by screws, to provide a rigid structure which is compact and houses the working and return runs of the chains.

The well 12 for the drive unit is secured to the vehicle floor and to an I-beam reinforcement 24 therefor via a nut and bolt 25 at each side of the drive unit.

The floor is supported within this well 12 by a box section 26 secured to an I-beam 27.

The apparatus is used to provide powered loading and unloading for, in the embodiment shown, unit load pallets 11. In use pallets 11 may be marshalled on a loading dock conveyor ready for pushing in to the vehicle. (The trailer floor is level with the dock system to accept pallets and properly aligned guide rails and ramps are commonly used).

Then:
Reverse trailer vehicle into position.
Plug power supply into socket.
Raise roller bed 9 rollers 10.
Start chain motor 5.
Lift rear section of chain track on particular bag 19.
Feed pallets until all pallets 11 are fully home and crowded or bunched.
Drop rear chain section 5.
Stop motor 14.
Lower roller track 9.
For unloading pallets:
Check trailer vehicle is properly aligned.
Plug in power supply.
Raise roller bed 9.
Start chain motor 14 in reverse.
Lift chain track 5. (This lift acts as a slipping clutch and avoids starting motor under load).
Front and rear sections of the conveyor can be used in sequence if desirable.
Pallets will feed out.
When pallets have left trailer.
Lower chain track.
Stop motor.
Lower rollers.

The division of the conveyor drive chain relieves wear on the track and reduces power demand since the rear chain track is normally capable of driving pallets down the roller bed.

All of the chain track can be used to unload, or the rear section first followed by the front section, depending on load condition.

Power decreases as pallets leave the trailer.

In either forward or reverse mode, the slip chains drive pallets along the (low) rolling resistance of the roller tracks. When one pallet comes up against an immediately preceding one which has stopped, the chain "slips" under the pallet so that power drive continues to operate to move succeeding pallets onto the support surface, without any burning out of the motor or jamming of the chain drive. This is because the chains each "slip" on the plastic slide block under the pallets.

It will be understood that the well can be at any convenient position along the length of the support surface, for example centrally thereof, or adjacent the forward end instead of the rear or loading end. Each chain is trained round sprockets which are connected to tensioner devices which are adjustable to provide the correct tension in each chain.

I claim:

1. Mechanical handling apparatus for transporting a load over a support surface, comprising a longitudinally driven endless conveyor chain trained around rotatable guides and extending through a working run and a return run, the working run extending along a length of said support surface over which loads are to be transported, elongate upwardly open guide channel means extending along the length of said working run for receiving and guiding a length of said chain in said working run as said chain moves longitudinally through said working run and having a base supporting the received length of chain from underneath, said guide channel means being received within another elongate upwardly open channel means extending along the length of said working run, the two of said channel means being vertically displaceable relative to one another, automated raising and lowering means including an inflatable bag disposed between said base of said guide channel means and a base of said another channel means for raising and lowering said guide channel means selectively, to raise and lower the length of chain received in said guide channel means, said chain, said guide channel means, said another channel means, and said raising and lowering means being arranged relative to said support surface such that when said guide channel means is raised, it supports the length of chain received therein above said support surface in a load-engaging position and such that when said guide channel means is lowered, the received length of chain will be lowered to a non-load-engaging position, and guide means for guiding the raising and lowering movement of said guide channel means by said raising and lowering means, said guide means including guide members secured to opposite sides of said another channel means and extending laterally inward of said another channel means so as to guidingly engage opposite sides of said guide channel means during raising and lowering of said guide channel means.

2. Apparatus according to claim 1, wherein said guide channel means contains an elongate support block on which the received length of chain is supported.

3. Apparatus according to claim 1, wherein said guides are rotatable on substantially horizontal axes and wherein said return run is disposed beneath said working run.

4. Apparatus according to claim 1, including at least one roller track running substantially parallel to said working run to one side thereof, said roller track having rollers raisable above said support surface to rollingly engage loads being transported by said chain and lowerable below said support surface so as not to engage loads supported on said support surface.

5. Apparatus according to claim 4, including two said roller tracks disposed to either side of said working run.

6. Apparatus according to claim 1, including two conveyor chains disposed side-by-side in said working run, each chain being received and guided by said guide channel means and supported by said base of said guide channel means, as aforesaid.

7. Apparatus according to claim 1, wherein said guide members are disposed for stopping the raising movement of said guide channel means.

8. Apparatus according to claim 7, wherein said base of said guide channel means is mounted on a raisable and lowerable support plate placed over said inflatable bag, and said guide members are disposed for stopping the raising movement of said guide channel means by engagement with said support plate.

9. Apparatus according to claim 8, wherein each said guide member is an angled member including one leg secured to said another channel means and another leg having a side disposed to guidingly engage a side of said guide channel means and a lower end disposed for stopping the raising movement of said guide channel means by engagement with said support plate.

10. Apparatus according to claim 9, wherein said support plate has portions which project laterally outward from said guide channel means and which come into engagement with the respective lower ends of said guide members when said guide channel means is raised.

11. Mechanical handling apparatus for transporting a load over a support surface, comprising
a longitudinally driven conveyor chain extending lengthwise through a working run which extends along a portion of said support surface over which loads are to be transported,
elongate upwardly open guide channel means for receiving and guiding substantially the entire length of chain in said working run and having base means supporting said length of chain from underneath along substantially the entire length of said working run, said guide channel means being raisably and lowerably received in another upwardly open channel means,
inflation actuated raising and lowering means including inflatable bag means disposed between said base means of said guide channel means and base means of said another channel means for selectively raising and lowering said guide channel means,
said raising and lowering means being operable to raise said guide channel means such that said length of chain moves longitudinally along said working run above said support surface in a load-engaging position and to lower said length of chain in the working run to a non-load-engaging position, and
guide means for guiding the raising and lowering movement of said guide channel means, said guide means including guide members secured to opposite sides of said another channel means and extending laterally inward of said another channel means so as to guidingly engage opposite sides of said guide channel means during raising and lowering of said guide channel means.

12. Apparatus according to claim 11, wherein said non-load-engaging position is below said support surface.

13. Apparatus according to claim 11, including at least one roller track running substantially parallel to the length of said working run adjacent to one side of said chain, said roller track having rollers and means for selectively raising said rollers above said support surface to rollingly engage loads engaged by said chain and lowering said rollers below said support surface.

14. Apparatus according to claim 13, including two said roller tracks adjacent to either side of said chain.

15. Apparatus according to claim 11, including two conveyor chains disposed side-by-side in said working run, each chain being received and guided by a common guide channel of said guide channel means and supported from underneath by a base of said guide channel.

16. Apparatus according to claim 11, wherein said guide members are disposed for stopping the raising movement of said guide channel means.

17. Apparatus according to claim 16, wherein said base means of said guide channel means is mounted on raisable and lowerable support plate means placed over said inflatable bag means and said guide members are disposed for stopping the raising movement of said guide channel means by engaging said support plate means.

18. Apparatus according to claim 17, wherein each said guide member is an angled member having one leg secured to said another channel means and another leg having a side disposed to guidingly engage a side of said guide channel means and a lower end disposed for stopping the raising movement of said guide channel means by engagement with said support plate means.

* * * * *